W. H. DENLEY.
MANUFACTURE OF FILES AND SAWS.
APPLICATION FILED DEC. 18, 1917.

1,268,819.

Patented June 11, 1918.
9 SHEETS—SHEET 1.

W. H. DENLEY.
MANUFACTURE OF FILES AND SAWS.
APPLICATION FILED DEC. 18, 1917.

1,268,819.

Patented June 11, 1918.
9 SHEETS—SHEET 2.

W. H. DENLEY.
MANUFACTURE OF FILES AND SAWS.
APPLICATION FILED DEC. 18, 1917.

1,268,819.

Patented June 11, 1918.
9 SHEETS—SHEET 4.

UNITED STATES PATENT OFFICE.

WILLIAM HENRY DENLEY, OF BIRMINGHAM, ENGLAND.

MANUFACTURE OF FILES AND SAWS.

1,268,819. Specification of Letters Patent. Patented June 11, 1918.

Application filed December 18, 1917. Serial No. 207,698.

*To all whom it may concern:*

Be it known that I, WILLIAM HENRY DENLEY, subject of the King of Great Britain, residing at 378 Moseley road, Birmingham, in the county of Warwick, England, have invented new and useful Improvements in the Manufacture of Files and Saws; and I do hereby declare the following to be a full, clear, and exact description of the same.

My invention relates to the manufacture of files and saws for cutting metal or other material.

One object of my invention is to provide a machine whereby the teeth of files and saws can be produced in a simple, inexpensive and automatic manner.

Another object of the said invention is to make provision for the automatic adjustment of the teeth cutters to compensate for any variation of the cutting surface of the file or saw from a straight surface or edge.

With these objects in view, together with others which will appear as the description proceeds, the invention resides in the novel formation, combination and arrangement of parts, all as will be described more fully hereinafter and particularly pointed out in the claims.

The invention will be understood by reference to the accompanying drawings, wherein:—

In one form of machine according to this invention as shown upon the accompanying drawings at Figs. 1–5, a series of files 1' are clamped in parallel relation along ridges 1 disposed along a slide 2 carried upon a suitable supporting bed 3, the slide being adapted to advance the files an amount equal to the pitch of the teeth being cut, under the influence of ratchet mechanism after the completion of each tooth. Preferably the slide is formed with a series of grooves 4 between the file supporting positions so that particularly in the case of half round files the cutter may travel right over the edge of the file, so that the teeth will be cut right up to the sharp edge.

A number of rotary cutters 5, which may be in the form of milling cutters or of circular saws, are provided carried by a suitable carrier 6, these cutters corresponding in number with the number of files to be operated upon. Preferably a plurality of carriers 6 each carrying cutters 5 corresponding in number with the files to be operated upon are employed so that a plurality of cutters will be operating upon each file but at different points in the length of the file.

This carrier 6, which is disposed above the files and at the angle at which it is desired to cut the teeth, is supported at each end in vertical members 7 pivoted at their lower ends 8, the connection between the carrier and the vertical members being free in a vertical sense as by the slide 9 and slot 10 against the action of a spring 11 and adjusting screw 12, so that the carrier and the cutters may rise and fall according to the form of the file blank upon which they are operating, while the vertical members being pivoted at the base the carrier can be rocked to and fro across the blanks under the influence of a suitable cam 13 and roller 14, being returned by a spring 15.

The cutters 5 which are adjustable vertically by mounting them in slides 16, depressed by springs 17 and adjusting screws 18, are preferably separately driven by independent belts 19 on pulleys 20 mounted upon the same spindle as the cutters 5. Disposed above the formers 21′ and 22′ which are mounted upon the two outside ridges 21, 22 of the slide are rollers 23 which correspond with the cutters and are similarly mounted and as the rollers traverse the formers the carrier is lifted or lowered against its spring connection with the aforementioned vertical pivoted members, the cutters then moving in the same manner as the rollers.

Figure 10:
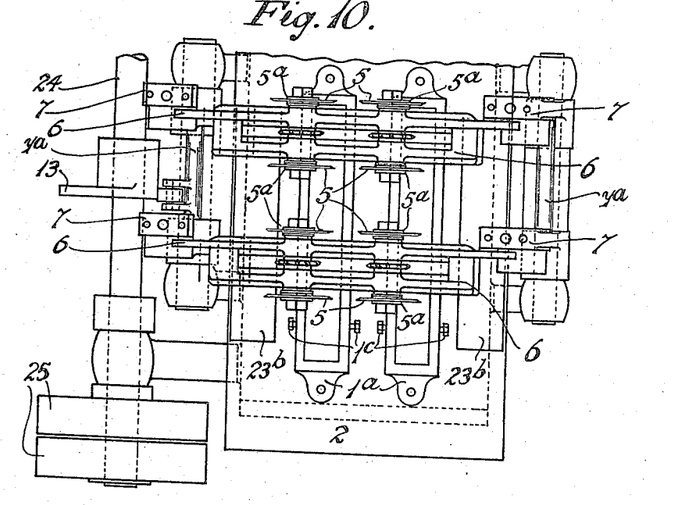
Fig. 10. is a detached plan showing a modified method of mounting and acuating the cutter carriers.

As illustrated there are three carriers each of which is independently actuated by a corresponding cam mounted upon the one shaft 24 driven by the pulleys 25, but if desired the carriers may be all connected together and actuated by one cam, in the manner shown in connection with two carriers in Fig. 10.

The slide and files are placed at an angle relatively to the cutters the relative angle determining the angle at which the file teeth will be cut across the file and obviously if the teeth are to be cut at right angles the slide will be at right angles to the cutting line of the cutters.

It will be seen from this that the cutters will exactly follow the path of the rollers which are controlled by the formers and if the formers correspond in shape with the file blanks the cutters will automatically produce the teeth required, traversing the irregular surface.

The spring supports for the cutters will also compensate for slight variations in the thickness of the file blanks while the independent adjustment of the cutters enables the operator to compensate for wear of the different cutters.

Means are provided for automatically advancing the slide an amount equal to one tooth of the file after each tooth has been cut so as to bring the blanks into position for cutting the next tooth. Such means comprises a ratchet wheel 26 keyed to a quick pitch screw 29 carried by the bed and engaging with the slide so that rotation of the screw will advance the slide to the desired extent. Loose on the end of the screw is a rocking member 27 which carries a pawl 30 which engages the ratchet wheel, the member 27 being actuated by a link 31 connected to the forward end of the shaft 24 so that when the cutters are performing their cutting traverse the pawl will merely pass the ratchet teeth, while on the return movement the ratchet wheel and screw will be rotated.

Figure 6:
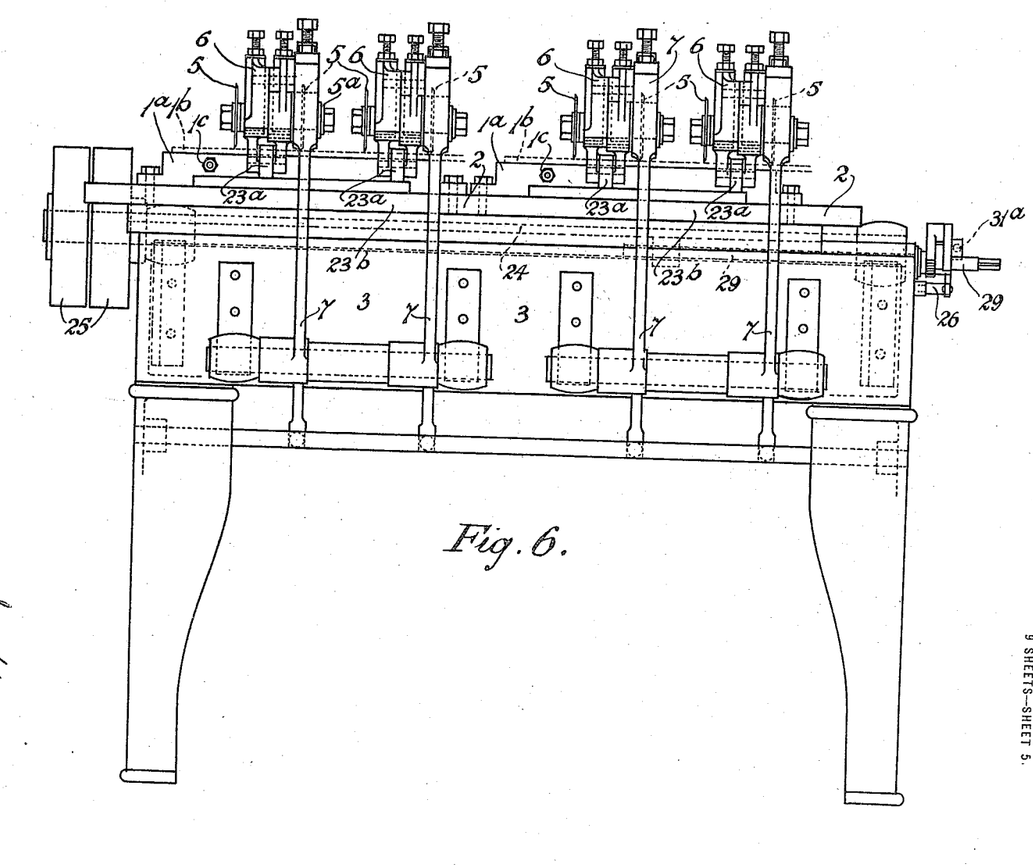
Fig. 6. is a side elevation of a modified form of machine more particularly applicable to the manufacture of hack saw blades.
Figure 7:
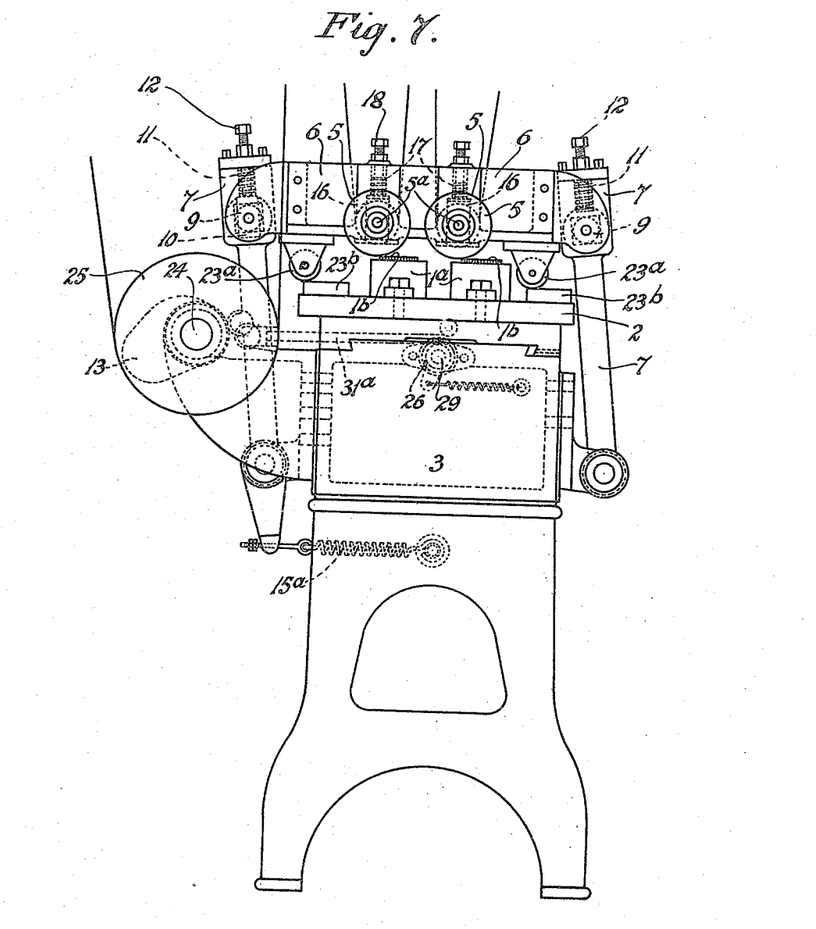
Fig. 7. is an end elevation of the same.
Figure 8:
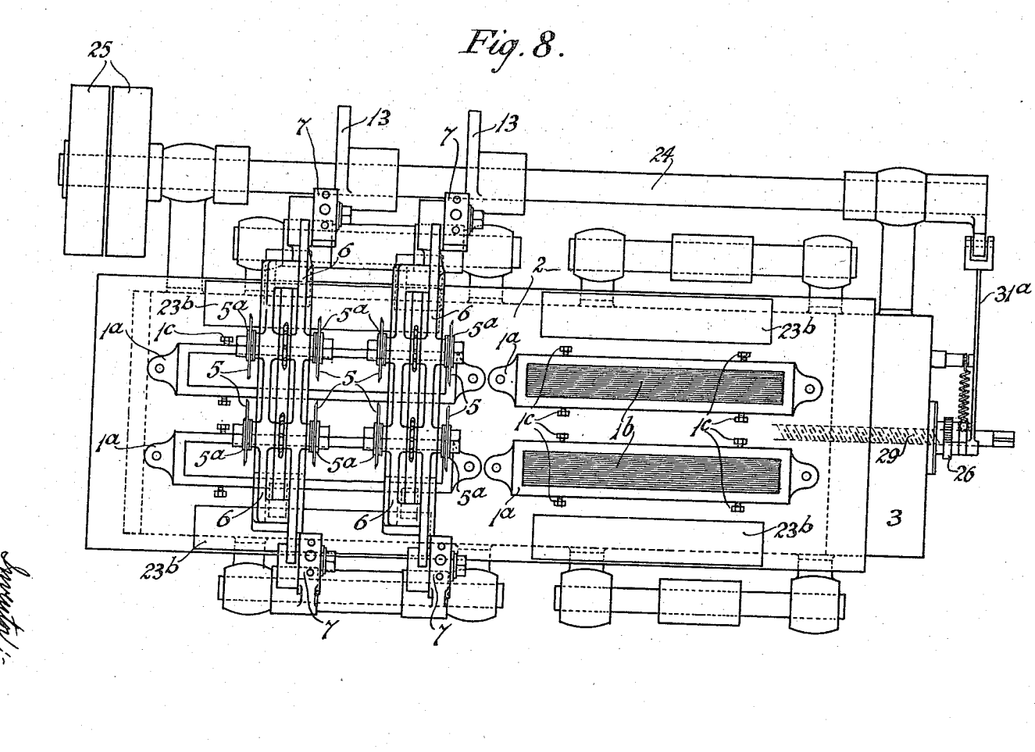
Fig. 8. is a plan of the same with two of the cutter carriers, cutters and cams removed.

The form of machine shown in Figs. 6–8 is designed more particularly for cutting teeth in hack saw blades. The table or slide 2 in this case is provided with a series of blank carriers or clamping devices 1$^a$ for gripping the saw blanks 1$^b$ in gangs so as to expose the edges to the cutters 5 as distinguished from the surfaces in the case of files. As shown these blank carriers 1$^a$ are adapted to receive a plurality of saw blanks side by side and are secured by the set screws 1$^c$.

Disposed above the blanks are the carriers 6 having spindles 5$^a$ and cutters 5, each carrier 6 being preferably supported by a pair of pivoted standards 7 with a spring controlled sliding joint 9, 10, 11 in similar manner to that described with reference to Figs. 1–5, a cam 13 and spring 15$^a$ or equivalent means being provided for causing the carrier and cutters to traverse across the blanks.

As shown there are four blank carriers and four cutter carriers, each cutter carrier carrying a pair of spindles and each spindle carrying two cutters. Thus four cutters would be simultaneously at work upon each set of blanks. There are also four cams one for each cutter carrier and all carried by the one shaft 24 driven by the pulleys 25.

Figure 9:
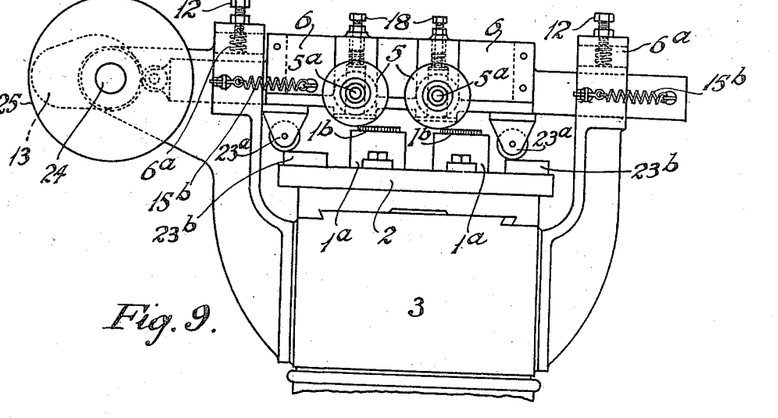
Fig. 9. is a detached end elevation showing another method of mounting and actuating the cutter carriers.

In the construction shown in Fig. 9, the pivoted standards are dispensed with and each cutter carrier 6 is in the form of a slide carried in guide 6$^a$ and makes a reciprocating movement across the blanks with the cam 13 acting directly against the end of the slide.

Fig. 10 shows two carriers 6 and their supports connected together by bridge pieces 7$^a$ and reciprocated by one cam 13. These carriers and their supports can be connected to the other carriers and supports of the machine and all be reciprocated by a single cam.

The cutters are resiliently supported in the same way as described with reference to Figs. 1–5 by slides 16, springs 17, and adjusting screws 18, and there may be several cutters suitably spaced apart upon each spindle so that there may be a plurality of cutters at work simultaneously upon the same gang of saw blanks, two cutters being shown on each spindle.

The cutters may be driven each by a separate belt in the manner described with reference to Figs. 1–5 or they may be driven in any other suitable way.

Means are preferably employed for automatically advancing the work an amount equal to the pitch of the teeth after each tooth has been cut, one method shown at Figs. 6-8 being to employ a screw 29 carrying a ratchet wheel 26 actuated by a link 31ª controlled by the shaft 24 and adapted to advance the slide an amount equal to the pitch of the teeth each time the shaft rotates and the cutters traverse.

The machine illustrated will cut the teeth at right angles to the length of the saw or they may be cut at an angle in which case the machine may be modified to bring the slide and bridge pieces at an angle to each other in manner shown in Figs. 1-5.

As shown, the cutter carriers are supported by rollers 23ª and by formers 23ᵇ the latter being carried upon the work bed, and while their use when manufacturing saws is not absolutely essential, yet it is preferred and may serve to regulate the depth of cut and to support the cutters steady in the cutting position.

The invention may also be applied to the manufacture of ordinary hand saws for cutting wood, in which case if the edge of the saw is curved longitudinally the former would be of a corresponding configuration.

Figure 1:
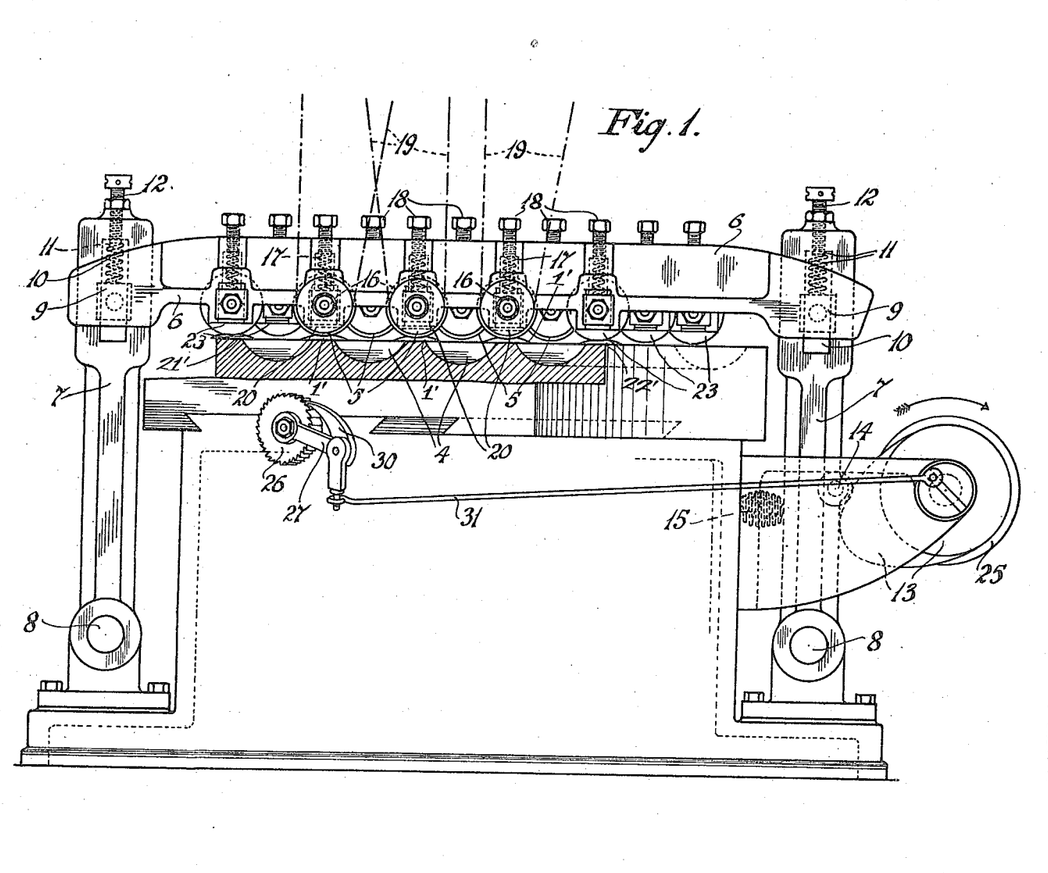
Figure 1. is a front elevation of a machine according to one form of the invention.
Figure 2:
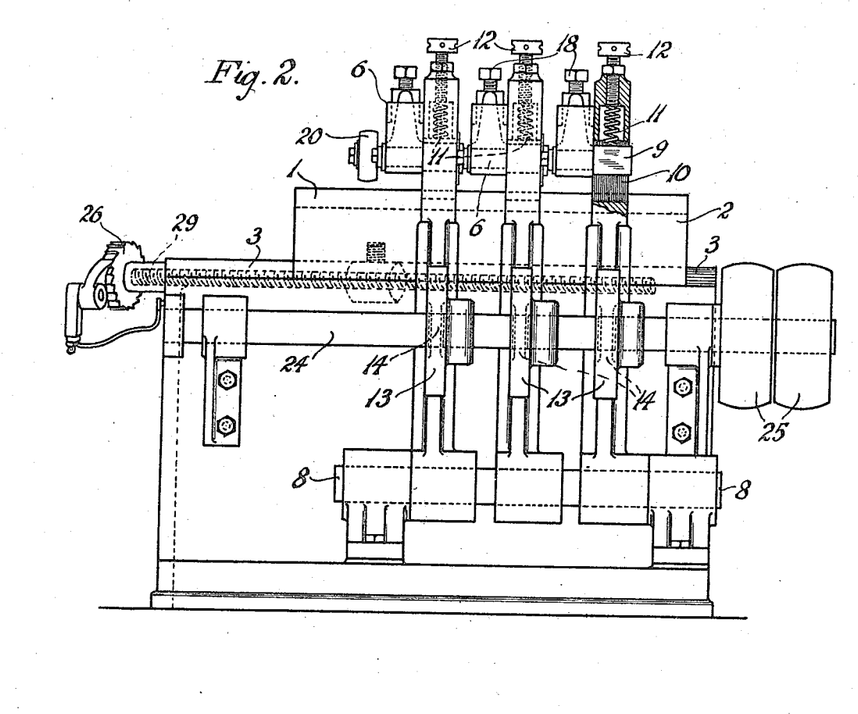
Fig. 2. is a side elevation of same.
Figure 3:
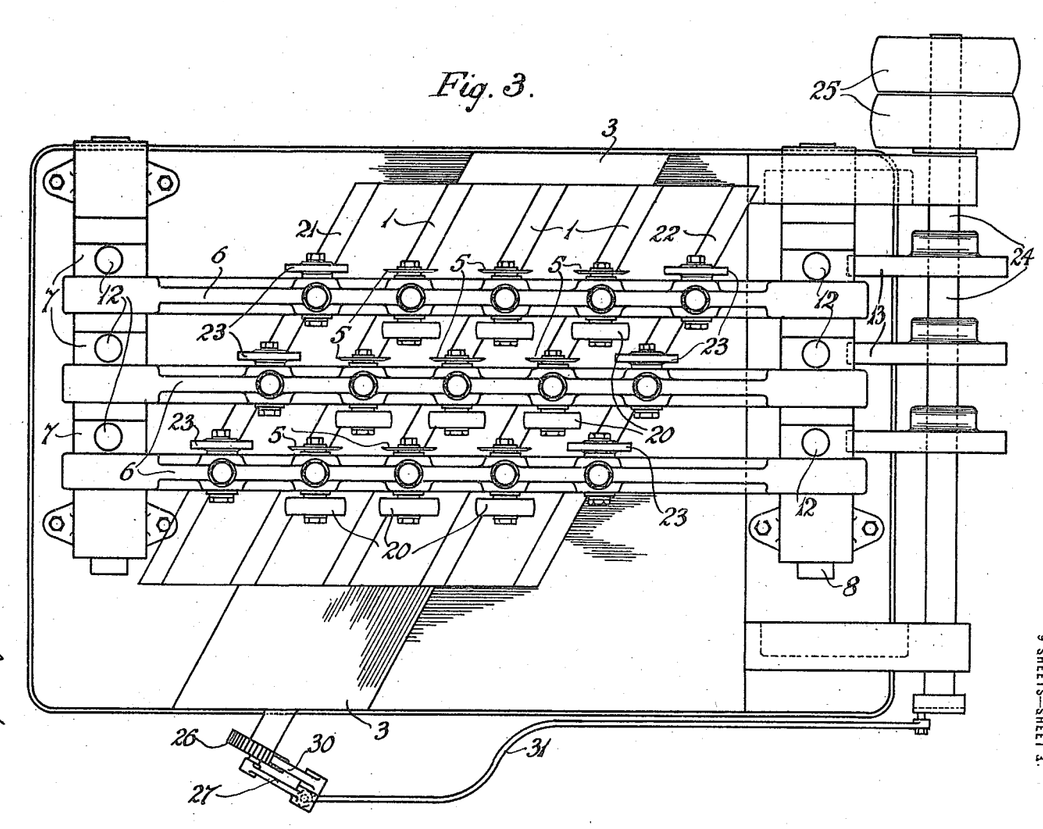
Fig. 3. is a plan.
Figure 4:
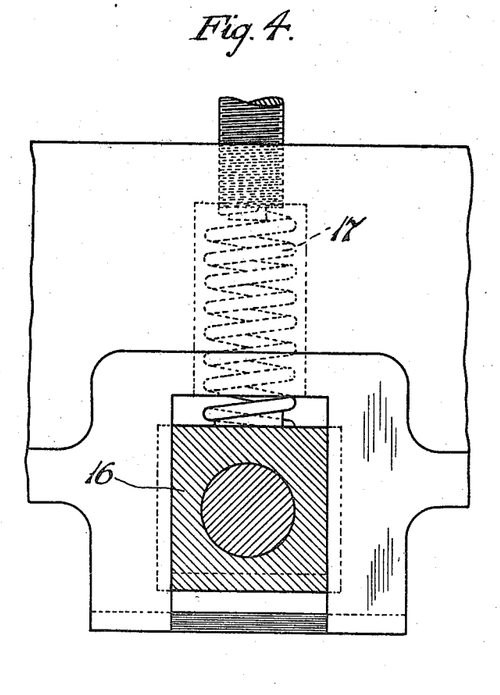
Figs. 4 and 5. are sectional views showing the manner of mounting the cutters and their driving pulleys.
Figure 5:
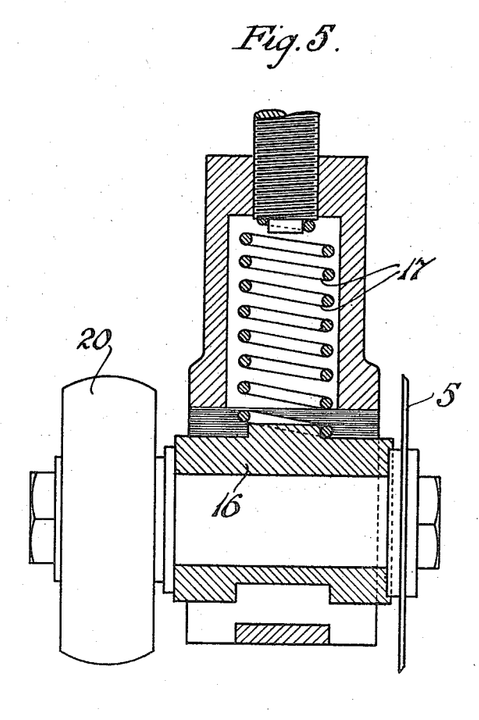

It will be appreciated that the machine described with reference to Figs. 6-8 may be employed for cutting files by substituting the form of file blank carrier shown in Figs. 1-3 for the saw blank carriers, and also that the machine described with reference to Figs. 1-3 may be used for cutting saw teeth by providing saw blank carriers such as shown in Figs. 6-8 on the work slide in place of file blank carriers.

In a modified form of machine according to this invention applicable to the manufacture of half round files as illustrated upon the accompanying drawings at Figs. 11-14, the blank carrier 40 is rotatable and is arranged to carry a plurality of, say three, blanks 41 upon high points 42 of the carrier, there being grooves or cut away portions 43 intemediate between the blank carrying portions to enable the cutters to travel right across the edge of the blank. The former 44 is of similar outline, or it may carry loose formers similar to the file blanks and is also rotatable.

The cutters 45 are carried by slides 46 and are in inclined relationship to the length of the file which may be effected by arranging the cutters with a horizontal axis and the files and file carrier with an inclined axis as shown. The cutter slides are capable of moving toward and from the blank carrier under the influence of the former 44 which acts as a cam and which engages the rollers 66 on the slides, and if a plurality of these slides, say three, be employed they are individually advanced and receded according to the configuration of the former at the point where it is operating upon the slide in question.

The blank carrier and the former may be geared by wheels 48, 49, 50 so as to rotate at the same speed and in the same direction, while the cutters are preferably independently driven by separate belts 51.

Figures 11, 12, 13, 14, 15, 16:
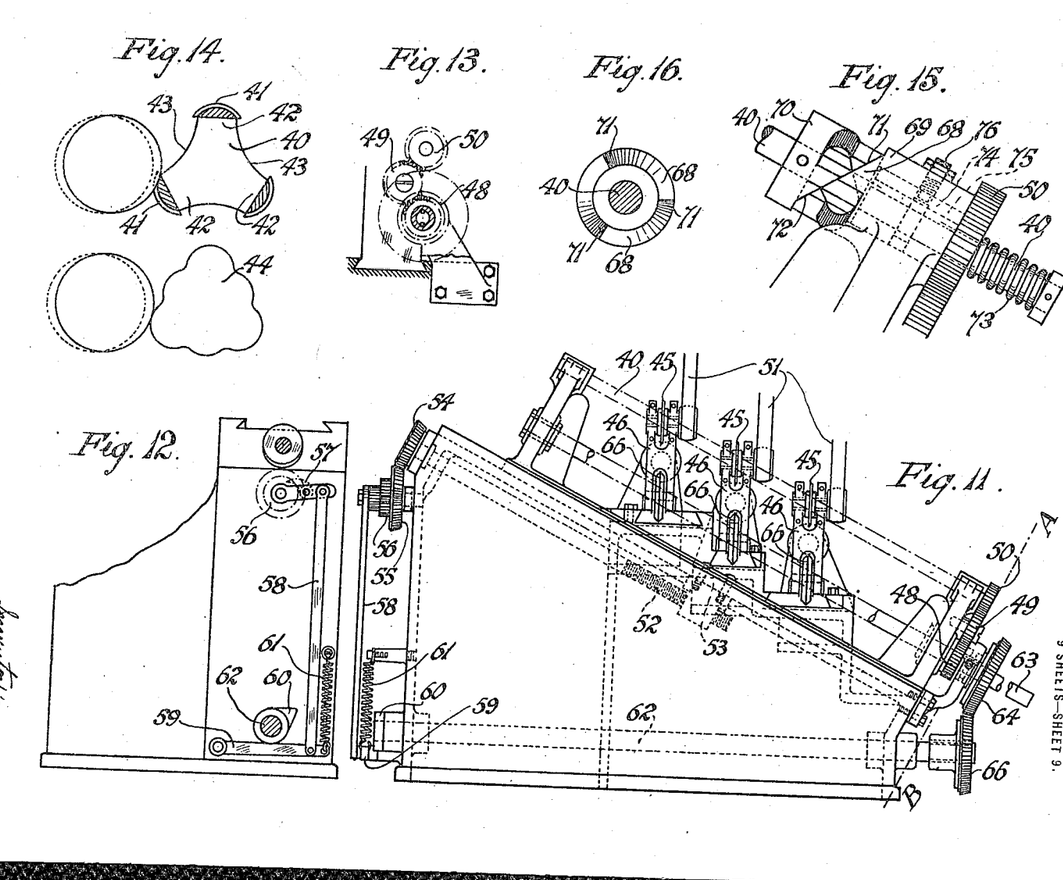
Fig. 11. is a side elevation of a modified form of machine particularly intended for the manufacture of half round files.
Fig. 12. is an end view of same.
Fig. 13. is a sectional end elevation on line A—B of Fig. 7 showing the gearing.
Fig. 14. is a diagrammatic cross sectional view showing the forms and relationship of the former and blank carrier.
Fig. 15. illustrates a cam arrangement for enabling the teeth to be cut at an angle.
Fig. 16. is an end view of the cam shown in Fig. 15.

In order to cut the teeth at an angle on the blank it is necessary to give to the blank carrier or cutter a certain amount of axial movement in addition to the rotary movement already explained. One form of apparatus producing this axial movement is illustrated at Figs. 15 and 16 in which a fixed cam 68 is mounted on the end of the bracket 69 and a movable co-acting cam 70 mounted on the blank carrier shaft 40 in such a manner than when the cutter commences to operate on the blank 41, the inclined portions 71 of the cam 68 engage with the inclined portions 72 of the cam 70 which in turn advances the carrier shaft 40 in an axial direction. After the cutter has traversed the blank the high points of the cam pass each other and the blank carrier returns axially to its original position by the spring 73. To allow the blank carrier shaft 40 to move axially as well as to rotate it is keyed by a sliding key 74 to the sleeve 75 formed integral with the gear wheel 50 and to prevent the sleeve 75 from being moved out of position it is secured by the pin 76 in the bracket 69. This mechanism is of course not necessary if the teeth are to be cut at right angles to the length of the blank.

Means are provided for advancing the blanks an amount equal to one file tooth after each cutting operation; such means comprising a screw 52 carried by the bed of the machine and engaging the slide 53 which carries the blanks and former so that when the screw is intermittently rotated the former and blanks are given an endwise movement relatively to the cutters. The screw 52 carries a miter wheel 54 which meshes with another wheel 55 which is connected to a ratchet wheel 56 engaged by a rocking pawl 57 carried by rocking bars 58, 59 which are depressed by the cam 60 and raised by the spring 61, the reciprocation of the pawl obviously actuating the ratchet wheel. The cam is carried by a shaft 62 which is driven from the former shaft 63 by wheels 64, 65.

If desired one cutter only may be used in operation upon one file; this being particularly advantageous when cutting rasps of coarse pitch or when adapted as a simple automatic machine.

The machines hereinbefore described with reference to Figs. 1-5 and 11-16 of the drawings have been particularly designed for the manufacture of files according to my prior Patent No. 1154578.

What I claim then is:—

1. A machine for the manufacure of toothed cutting tools comprising in combination blank carrying means, feed means adapted to intermittently feed said blank carrying means, reciprocatory means moving at an angle to the direction of feed of said blank carrying means, rotary cutters operatively mounted in said reciprocatory means; and forming means mounted on said reciprocatory means and coöperating with said reciprocatory means whereby the last named means will describe the desired path during operation of said cutters.

2. A machine for the manufacture of toothed cutting tools comprising in combination blank carrying means; automatic means whereby an intermittent feeding movement is given to said blank carrying means; and rotary cutters resiliently mounted in said reciprocatory means whereby the distance of each cutter from said blank carrying means can vary to accommodate itself to variations between the blanks.

3. A machine for the manufacture of toothed cutting tools comprising in combination a bed; a feed table mounted on said bed; means provided on said table whereby blanks can be secured thereto; arms pivotally connected to said bed; cutter carriers slidably mounted on said arms, cam mechanism operating on said arms whereby a reciprocatory motion of said arms and said carriers is obtained; and rotary cutters mounted on said carriers.

4. A machine for the manufacture of toothed cutting tools comprising in combination a bed; a feed table mounted on said bed; means provided on said table whereby blanks can be secured thereto; arms pivotally connected to said bed; cutter carriers slidably mounted on said arms; cam mechanism operating on said arms whereby a reciprocatory motion of said arms and said carriers is obtained; rotary cutters mounted on said carriers; and forming means mounted on said table and acting on said carriers whereby the distance of said carriers from said table is controlled during the reciprocatory movement of said carriers.

5. A machine for the manufacture of toothed cutting tools comprising in combination a bed; blank carrying means provided on said bed; reciprocatory cutter carriers resiliently carried by said bed; and cam mechanism reciprocating said carriers.

6. A machine for the manufacture of toothed cutting tools comprising in combination a feed table; means thereon for securing a plurality of blanks thereto; cutter carriers mounted above said table; means acting on said carriers and moving same in one direction, spring means operating on said carrier and moving same in an opposite direction; and feed means in operative connection with said cam mechanism and intermittently moving said table.

7. A machine for the manufacture of toothed cutting tools comprising in combination a feed table; means provided on said feed table whereby a plurality of blanks can be mounted thereon; pivoted arms on said machine; sliding bearings on said arms; cutter carriers mounted in said bearings and extending across said table; formers of the same shape and cross section as the file blanks mounted on said table; means on said cutter carriers riding on said formers whereby the vertical position of said carriers is controlled and a plurality of rotary cutters resiliently mounted in said carriers.

8. A machine for the manufacture of toothed cutting tools comprising in combination a blank carrying feed table; a plurality of cutter carriers reciprocating across said feed table; a plurality of vertically slidable bearings mounted in said carriers, cutter spindles mounted in said bearings; rotary cutters on said spindles; and adjustable spring means acting on said bearings whereby adjustment of said cutters can take place to compensate for variation of the diameter of said cutters.

9. A machine for the manufacture of toothed cutting tools comprising in combination a blank carrying feed tape, carriers reciprocating across said table; vertically displaceable bearing means in connection with said carriers; rollers on said carriers; rotary cutters mounted on said carriers; and formers of the same shape and cross section as the blanks mounted on said table and coöperating with said rollers whereby said carriers are vertically supported by said formers and said cutters are retained in their correct vertical relationship to the blanks during cutting.

10. A machine for the manufacture of toothed cutting tools comprising in combination blank carrying means, reciprocatory means mounted above said blank carrying means, rotary spindles mounted in said reciprocatory means; rotary cutters mounted on said spindles; and a rotary driven element mounted on said spindle whereby rotation of said driven element produces rotation of said cutters and reciprocation of said carrier traverses the rotating cutters across the blanks thereby performing tooth cutting operations thereon.

11. A machine for the manufacture of toothed cutting tools comprising in combination means for carrying a plurality of blanks; a plurality of reciprocatory means above said blank carrying means; a plurality of rotary cutters mounted on said reciprocatory means and operating upon different parts of said blanks; and forming means acting at different points on each of said carriers whereby said carriers are independently controlled.

12. A machine for the manufacture of toothed cutting tools comprising in combination a feed table; means on said table whereby gangs of saw blanks are secured thereto; cutter carriers reciprocating at right angles to the longitudinal axis of the blanks; rotary cutters mounted in said cutter carriers with their plane of rotation at right angles to said longitudinal axis; means whereby said carriers are reciprocated; and automatic feed means whereby said feed table is fed in the direction of the longitudinal axis of said blanks.

In testimony whereof I affix my signature.

WILLIAM HENRY DENLEY.

Copies of this patent may be obtained for five cents each, by addressing the "Commissioner of Patents, Washington, D. C."